United States Patent [19]

Basrai et al.

[11] 4,422,474
[45] Dec. 27, 1983

[54] ELECTRO-HYDRAULIC REMOTE VALVE

[75] Inventors: Habil S. Basrai, Port Huron, Mich.; Ganesh Rajagopal, Richardson, Tex.

[73] Assignee: Ford Motor Company, Dearborn, Mich.

[21] Appl. No.: 301,789

[22] Filed: Sep. 14, 1981

[51] Int. Cl.³ .................................. F15B 13/043
[52] U.S. Cl. ......................... 137/625.64; 91/361; 91/464
[58] Field of Search ............ 91/361, 363 R, 363 A, 91/464; 137/625.64; 251/131

[56] References Cited

U.S. PATENT DOCUMENTS 3,763,745  10/1973  Andersen ..................... 91/363 R X
3,774,641  11/1973  Mindner et al. ............... 137/625.64
4,132,273   1/1979  Mortonson et al. .......... 91/363 A X

FOREIGN PATENT DOCUMENTS 56-39311  4/1981  Japan ........................... 137/625.64

Primary Examiner—Gerald A. Michalsky
Attorney, Agent, or Firm—John J. Roethel; Daniel M. Stock; Clifford L. Sadler

[57] ABSTRACT

An application of the basic system of patent application Ser. No. 149,065 for operating a remote hydraulic valve. An electro-hydraulic actuator is mechanically linked to the control member of the remote valve. An input control signal is generated by multiplying a signal from a control handle position transducer by a scale factor constant produced by a full control setting with a gain control circuit. The gain control circuit also operates to set the constant to unity in case the signal from the handle position transducer exceeds a predetermined level corresponding to a maximum control handle setting.

The control handle itself has four positions: Float, Lower, Neutral and Raise. The handle is biased so that if the handle is released from any position other than Neutral, the handle will go to the Neutral position provided a detent is off. The detent is put in the "off" position by an electrical solenoid which is actuated whenever the supply pressure to the remote valve exceeds a set value. By this means the handle is released from either Raise or Lower position when conditions occur corresponding to the remote valve hitting the end of its stroke or it is being overloaded.

6 Claims, 2 Drawing Figures

ELECTRO-HYDRAULIC REMOTE VALVE

TECHNICAL FIELD

This invention relates to an electrical control system for operating any hydraulic remote valve.

BACKGROUND OF THE INVENTION

In our copending applications Ser. No. 149,065 filed May 12, 1980 for an Electro-Hydraulic Proportional Actuator and Ser. No. 166,731 filed July 7, 1980 for an Electrically Operated Hydraulic Power Lift System, now U.S. Pat. No. 4,343,365, we noted that agricultural tractor controls traditionally have been a hydro-mechanical system wherein, for example, implement draft is sensed mechanically. Through appropriate mechanical linkage, a hydraulic valve is actuated to supply operating fluid to a hydraulic cylinder for raising and lowering the implement.

The development of low-cost, reliable electronic microcomputers has introduced an unlimited flexibility in the design of tractor control systems. The primary requirement for implementing any tractor electro-hydraulic system is a low-cost, contaminant insensitive, environmentally sound interface device, preferably a hydraulic proportional actuator, such as is disclosed in our aforementioned application Ser. No. 149,065, for converting an electric signal to either a mechanical or hydraulic output device.

Operation of a hydraulic proportional actuator to control, for example, a hydraulic remote valve, requires a compatible control system such as is provided by the present invention.

SUMMARY OF THE INVENTION

The present invention relates to an application of the basic system disclosed in our application Ser. No. 149,065 for operating a remote hydraulic valve. The hydraulic proportional actuator is mechanically linked to the control member of the remote valve and is electronically linked to a control handle. The position of the control handle is monitored continuously by a handle position potentiometer (transducer). An input control signal KVp is generated by multiplying the output signal Vp of the handle position transducer by a scale factor K produced by a full control setting with a gain control circuit. The gain control circuit also operates to set K to unity in the case the Vp exceeds a predetermined level $Vp_4$ corresponding to a maximum control handle setting.

The control handle itself has four positions, float, lower, neutral and raise. The handle is spring centered by a torsion spring arrangement so that if the handle is released from any position other than neutral, the handle will go to the neutral position provided a detent is off. The detent is put in the "off" position by an electrical solenoid which is actuated whenever the supply pressure to the remote valve exceeds a set value. By this means, the handle is released from either raise or lower position when conditions occur corresponding to the remote cylinder hitting the end of its stroke or its being overloaded.

DESCRIPTION OF THE DRAWINGS

Further features and advantages of the present invention will be made more apparent as this description proceeds, reference being had to the accompanying drawings, wherein.

DETAILED DESCRIPTION OF THE INVENTION

Figure 1:
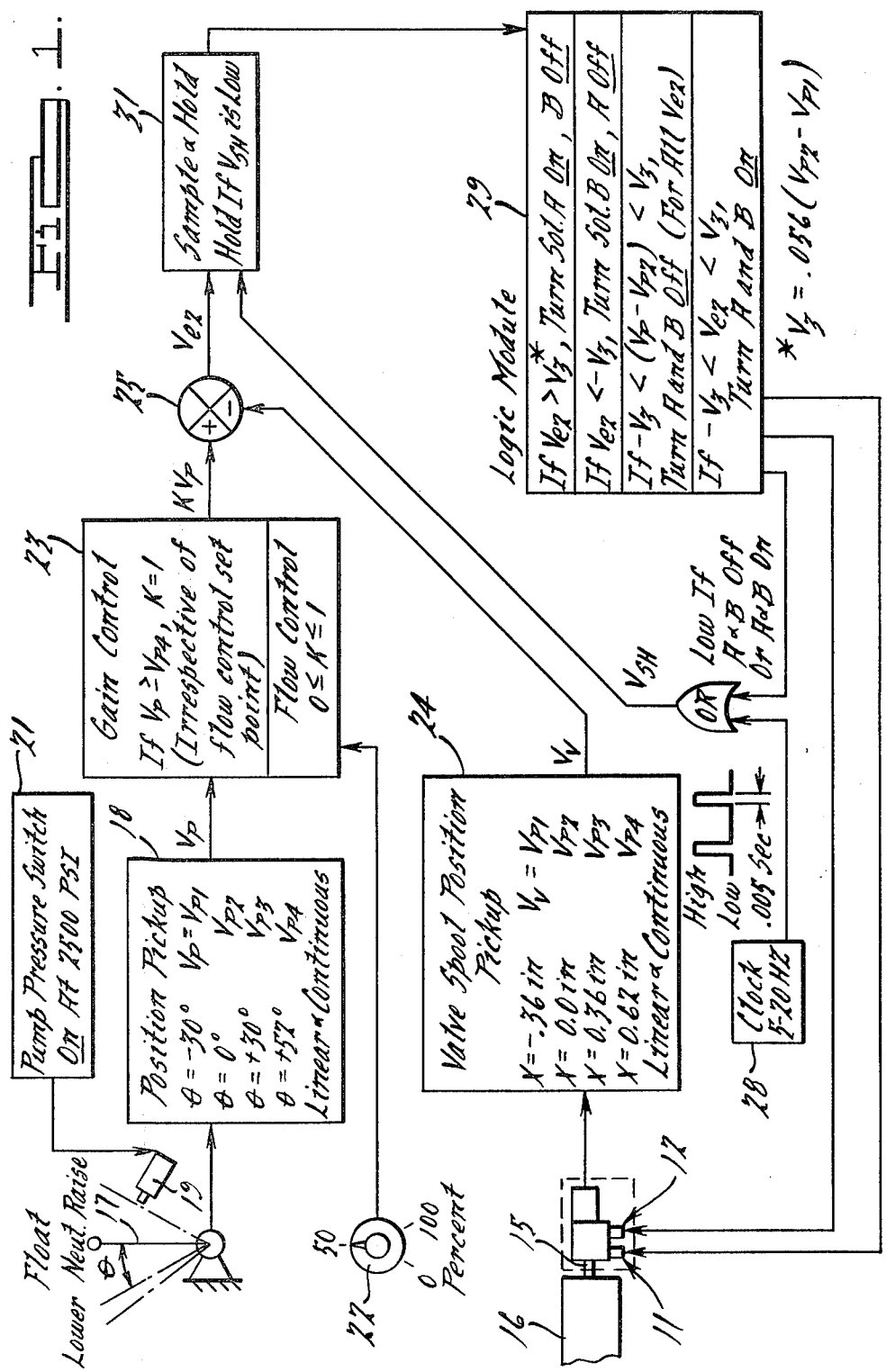
FIG. 1 is a schematic diagram of the electronic control circuit for controlling an electro-hydraulic actuator for operating a remote hydraulic valve.

Referring now to the drawings, the hydraulic proportional actuator 10, as more fully explained in our application Ser. No. 149,065, comprises two three-way solenoid operated valves 11 and 12 adapted to control the flow of fluid from a pressure supply 13 to either side of an actuator piston 14. The actuator piston rod 15 is mechanically coupled to a remote valve 16 through which fluid is supplied to a hydraulic cylinder (not shown) for moving an implement or the like. The activation/deactivation of the solenoid valves is controlled by an electronic control system, the schematic diagram of which is shown in FIG. 1. The system shown in FIG. 1 is adapted for a hydraulic remote valve 16 which meters flow as a function of the valve spool displacement. A linearly movable actuating extension of the valve is shown as extending from the right side of the remote valve 16 to engage the piston rod 15 of actuator piston 14 in FIG. 1. In the disclosed embodiment a linear metering characteristic is assumed, but the control system can be adapted to a valve with any sort of metering characteristics that are available on the market.

Operation of the control system is initiated by operator movement of a control handle 17. The control handle 17 has four detent positions, Neutral, Raise, Lower and Float. The position of the control handle 17 is monitored continuously by a handle position potentiometer (transducer) 18. The handle is spring centered by a torsion spring (not shown) so that if the handle is released from any position other than Neutral, the handle will go to the Neutral position provided a detent (not shown) is off. The detent can be put in the off condition by means of an electrical force solenoid 19. This solenoid is actuated whenever the supply pressure to the remote valve exceeds a set value in an electrical pressure switch 21. The legend in the box 21 indicating the pressure switch indicates, for example, that the pump (supply source) switch would be "on" at 2500 psi (175.75 kgm/cm$^2$). The purpose of providing the pressure switch operated detent mechanism is to provide for the automatic release of the handle from either Raise or Lower positions so that the handle (and the remote valve) can return to the Neutral position when the system pressure exceeds the switch pre-set value. This condition is normally experienced whenever the cylinder (or motor) being operated by the remote valve hits the end of its stroke or is overloaded. A flow control knob 22 is provided at the control console of the tractor to set the maximum flow from the remote valve when the handle is in either Raise or Lower detent positions.

The translation of the position of the control handle 17 into a position of the remote valve spool occurs as follows. The output Vp of the control handle position transducer 18 is first fed into a gain control device 23 that attenuates the signal in proportion to the flow control 22 setting at the control console. When the control handle 17 is moved to the Float position, the flow control setting is overridden and the signal goes through with a unity gain. The desired position of the remote valve 16, KVp, is compared with the actual position of the valve, Vv, as determined by a valve spool transducer 24. The difference KVp-Vv is the output $V_{e2}$ of the summing device 25. The error signal $V_{e2}$ is used to drive the electro-hydraulic proportional actuator 10. As previously described, the actuator piston 14 is attached to the spool (not visible) of the remote valve 16.

In the Neutral condition, when the control handle is within the Neutral zone, as defined by the magnitude of (Vp-Vp$_2$) being within V$_3$, both solenoid valves are turned off. The actuator piston is free to float in this condition and the position of the remote valve is determined by centering springs on the remote valve spool. In the Float position of the valve spool, the two output ports of the remote valve are connected together and to the sump.

Figure 2:
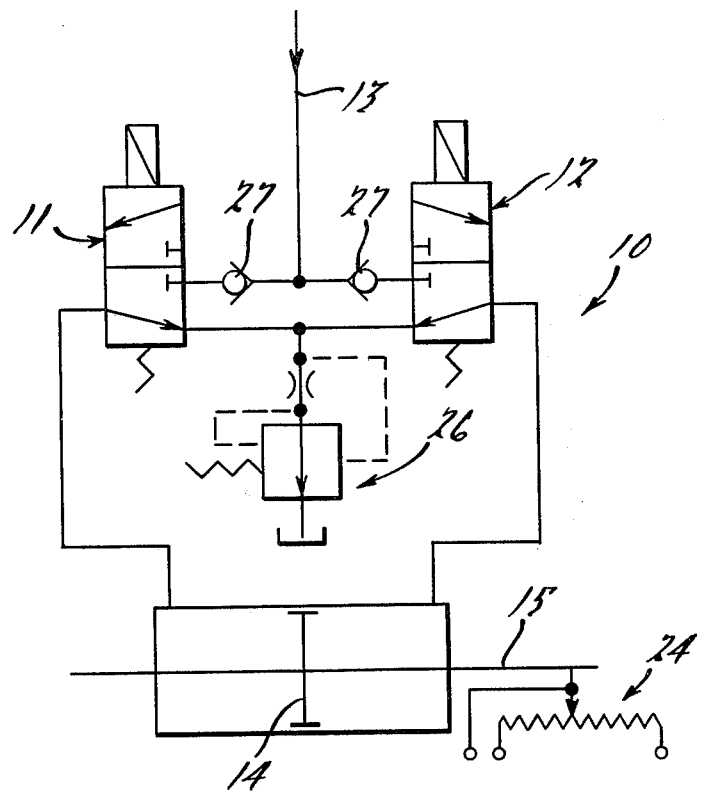
FIG. 2 is a diagram of a preferred electro-hydraulic proportional actuator.

If $V_{e2}$ is greater than $V_3$, the actual position of the remote valve lags the desired position and solenoid valve 11 is turned on and solenoid valve 12 is turned off. This makes the actuator piston 14 move to the right, as viewed in FIG. 2, as a speed determined by the actuator flow control valve 26. If $V_{e2}$ is less than $-V_3$, solenoid valve 12 is turned on and solenoid valve 11 is turned off. This makes the actuator piston 14 move to the left. When the difference between the desired position and actual position of the valve is within a prescribed tolerance band, both the solenoid valves 11 and 12 are turned on. This effectively holds the actuator at that position because of the two check valves 27 in the pressure inlet lines to the valves.

The clock 28 is used to set a maximum rate at which the solenoids 11 and 12 are turned on and off. During the sampling time intervale, when the clock output is "high", the sample and hold device allows $V_{e2}$ to go through the logic module 29 which makes the decisions on turning the two solenoids 11 and 12 on or off. If, during the the clock period, the desired position is reached, as evidenced by either the two solenoids 11 and 12 being both on or both off, the sample and hold circuit 31 freezes the value of $V_{e2}$ at that instant so that no further decisions are made by the logic module 29 until the next sampling time interval. This effectively ensures that the solenoids can be turned on and off only once during a clock period. This provides for an acceptable cycle life for the solenoid valves. The clock frequency is a function of the fastest input signal frequency to be followed. If the input handle 17 where to be moved with a speed equivalent to a 5 Hz signal, the desirable clock frequency would be about 20 Hz. It is possible for the control system to automatically vary the clock frequency as a function of input requirements so that at slower speeds, a slower frequency can be used, which further extends the life of the solenoid valves.

The advantages of the electro-hydraulic remote valve are:

It permits the use of simple on/off, three-way solenoid valves which are inexpensive and relatively insensitive to contamination.

It may be used on current mechanical/hydraulic remote valves where space is available to mount the proportional electro-hydraulic actuator.

In tractors with enclosed cabs, the electro-hydraulic remote valve system will help reduce noise levels due to the use of noise-tight electrical connectors; it will also save time during assembly and disassembly of cabs from tractors.

The remote valves can be located at great distances from the operator since no linkages or hoses are involved between the control station and the valve (either few wires or two wires and an optical cable or one conductor cable carrying multiplexed signals).

The life of the solenoid valves is extended by limiting the maximum sampling frequency in the control system. The valves are turned off at the Neutral position.

It is to be understood that this invention is not limited to the exact construction illustrated and described above, but that various changes and modifications may be made without departing from the spirit and scope of the invention as defined in the appended claims.

We claim:

1. An electrical control system for a hydraulic power system that includes a source of pressurized fluid and a hydraulic remote valve means for directing the application of the pressurized fluid to move an implement in selective directions, the remote valve means including a linearly movable actuating portion;

the electrical control system comprising:

an electro-hydraulic actuator connected to the pressurized fluid source having an operating member coupled to the remote valve means actuating portion;

the actuator including a flow control valve connected to an adjustable flow rate control means for setting the flow rate of the pressurized fluid to the hydraulic remote valve;

a control handle having multi-detent positions;

and a feedback electronic control circuit that translates the position of the control handle into a position of the actuating portion of the hydraulic remote valve;

the feedback electronic control circuit including a control handle position transducer that produces a handle position indicating output signal;

a gain control circuit into which the output signal is fed to attenuate the same in proportion to the flow rate setting of the adjustable flow rate control means;

a position transducer means coupled to the operating member of the electro-hydraulic actuator for generating a signal sensing the actual position of the operating member;

a differential summing device having as its inputs the output signal of the gain control circuit and of the electro-hydraulic actuator operating member position sensing signal and as its output an error signal representing the difference between the actual and desired positions of the implement;

a sample-and-hold circuit having an input to receive the error signal;

and a clock logic means for transmitting the error signal at predetermined time intervals from the sample-and-hold circuit to the electro-hydraulic actuator to activate the latter to operate the hydraulic remote valve to cause the implement to move in raising or lowering direction or to hold the implement against movement.

2. An electrical control system according to claim 1, in which:

the control handle has at least four detent positions, Neutral, Raise, Lower and Float;

the position of the handle being continuously monitored by a handle position transducer.

3. An electrical control system according to claim 2, in which:

the control handle is biased to return to Neutral from any other position upon release of a solenoid actuated detent mechanism;

and a pressure responsive switch means is provided for energizing the solenoid actuated detent mechanism upon the pressurized fluid to the hydraulic remote valve exceeding a preset value.

4. An electrical control system according to claim 2, in which:

the control handle is biased to return to Neutral from either Raise or Lower positions so that the handle and the remote valve can return to a Neutral position upon release of a solenoid actuated detent mechanism;

and a pressure responsive switch means is provided for energizing the solenoid actuated detent mechanism upon the pressure of the pressurized fluid exceeding a set value.

5. An electrical control system according to claim 1, 2 or 4, in which:

the adjustable flow rate control means is positionable to set the maximum flow from the hydraulic remote valve when the handle is in either Raise or Lower detented positions.

6. An electrical control system according to claim 1, in which:

upon the control handle being moved to a Float position, the flow control means setting is overridden and the command signal does through the gain control circuit with a unity gain.

* * * * *